United States Patent [19]

Delajoud

[11] 4,413,526
[45] Nov. 8, 1983

[54] DEVICE FOR ACCURATELY MEASURING FLUID PRESSURE WITH DISPLAY OF THE MEASURED PRESSURE

[75] Inventor: Pierre Delajoud, Neuilly-sur-Seine, France

[73] Assignee: Desranges & Huot, Aubervilliers, France

[21] Appl. No.: 257,610

[22] Filed: Apr. 27, 1981

[30] Foreign Application Priority Data

Apr. 30, 1980 [FR] France ................................ 80 09889

[51] Int. Cl.³ .......................... G01L 7/16; G01L 9/10
[52] U.S. Cl. ..................................................... 73/745
[58] Field of Search ................. 73/701, 745, 4 R, 4 D, 73/744

[56] References Cited

U.S. PATENT DOCUMENTS 3,744,316  7/1973  Kuzyk ................................. 73/701

FOREIGN PATENT DOCUMENTS 280938  8/1971  U.S.S.R. ............................... 73/745

Primary Examiner—Donald O. Woodiel
Attorney, Agent, or Firm—Parmelee, Bollinger & Bramblett

[57] ABSTRACT

For the very accurate measurement of fluid, particularly gas or hydraulic fluid, pressures, the device comprises a vertical cylinder, a piston adapted to slide in this cylinder with viscous friction, the pressure to be measured being applied to the upper face of the piston, means (motor) for rotating said piston in said cylinder, an electromagnetic precision weighing machine with a display comprising a shaft to which is applied the force to be measured, and means for transmitting to said shaft the force applied to the piston by the pressure to be measured, with limitation of the maximum forces.

13 Claims, 4 Drawing Figures

DEVICE FOR ACCURATELY MEASURING FLUID PRESSURE WITH DISPLAY OF THE MEASURED PRESSURE

The invention relates to the measurement of fluid pressures, particularly of gases and hydraulic fluids, with very great accuracy, in particular to provide pressure standards for checking the calibration of pressure gauges, as well as pressure sensors and transmitters.

Pressure standards are known, commercialized by the applicant, which comprise essentially a cylinder with vertical axis of very high precision in which slides a piston whose upper part carries a horizontal plate, means being provided for rotating the piston in the cylinder so as to center it therein. The pressure to be measured, which acts on the lower face of the piston, is balanced by calibrated weights placed on the plate. If we call M the total mass acting on the piston from top to bottom, S the effective section of the cylinder-piston assembly on which acts, from bottom to top, the pressure P to be measured and g the acceleration of gravity, we have $P=(Mg/S)$ (1).

Such pressure standards are very accurate, but they require the use of a series of expensive high-precision calibrated weights, made for example from stainless steel, and automatic means for placing the masses on the plate and removing them therefrom. Furthermore, the handling of the weights requires a certain time, for the system must be balanced by means of a certain number of weights, and the indications borne by the weights must then be read and totaled so as to obtain M. Then the pressure P is determined by the above-mentioned formula (1). Sometimes, to facilitate the measurements, the weights also carry a pressure indication corresponding to a specific effective section S.

The present invention aims at facilitating and speeding up the measurement of the pressure by allowing instantaneous display, preferably in digital form, of the weight M and so of the pressure P.

The invention consists, instead of balancing the pressure by means of a total mass formed by a series of elementary calibrated weights (as in the prior technique), to "weigh" this pressure, i.e. to cause the pressure to act on a weighing machine which measures the force corresponding to this pressure (it is known that a pressure is equal to a force divided by the area over which this force is applied).

For very accurate determination of the pressure and immediate display thereof, this "weighing" is achieved by means of a high-precision weighing machine with immediate display, in particular an electromagnetic rebalancing weighing machine, called hereafter simply electromagnetic weighing machine. It is a question of a dynamometric weighing machine.

The invention has then as object a device for the very accurate measurement of fluid pressures with display of the measured pressure, characterized by the fact that it comprises, in combination, a vertical cylinder, a piston slidable in this cylinder with a viscous friction, the pressure to be measured being applied to the upper face of the piston, means for rotating said piston in said cylinder, a precision electromagnetic weighing machine with display comprising a shaft to which the force to be measured is applied and means for transmitting to said shaft of the weighing machine the force applied to the piston by the pressure to be measured, with limitation of the maximum forces.

Preferably, the speed of rotation of the piston corresponds to the time of a complete revolution thereof in the cylinder which is less than the integration time of the electronic measuring device of the weighing machine so as to have stable display determined by the average of the forces applied to the piston during its rotation during a complete revolution.

Means are advantageously provided for limiting the torque of the motor for rotating the piston should the piston jam in the cylinder, under the effect of an overpressure for example.

In the preferred embodiment, the measuring element comprising essentially the cylinder and the piston is interchangeable, which permits the use, with the same weighing machine, of different measuring elements comprising effective sections of different dimensions on which the pressure to be measured is applied, which allows pressures to be measured in very different ranges of values with excellent precision.

With a device according to the invention, overpressures or depressions can be measured with respect to the atmospheric pressure.

Advantageously, the effective sections of the measuring elements are chosen so that, under normal conditions of temperature and pressure and for normal values of g, a whole and simple number of bars (or pounds per square inch) is counterbalanced by a mass of 1 kg.

The invention will be described in detail with reference to the accompanying drawings, in which.

Figure 2:
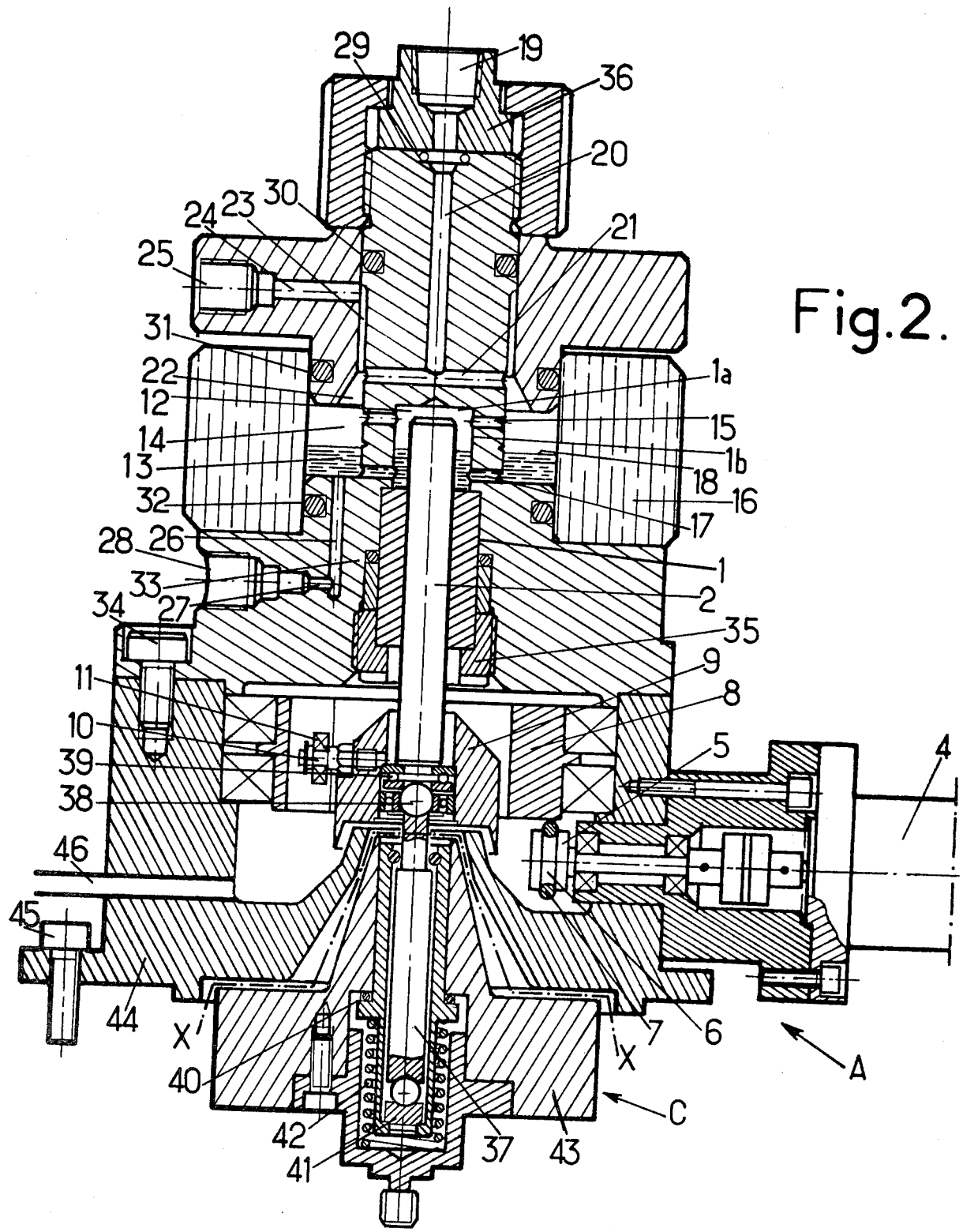
FIG. 2 is an enlarged axial section of the upper part of FIG. 1, i.e. the assembly acting on the electromagnetic weighing machine properly speaking, with the means for transmitting the force of the piston to the shaft of the weighing machine.
Figure 4:
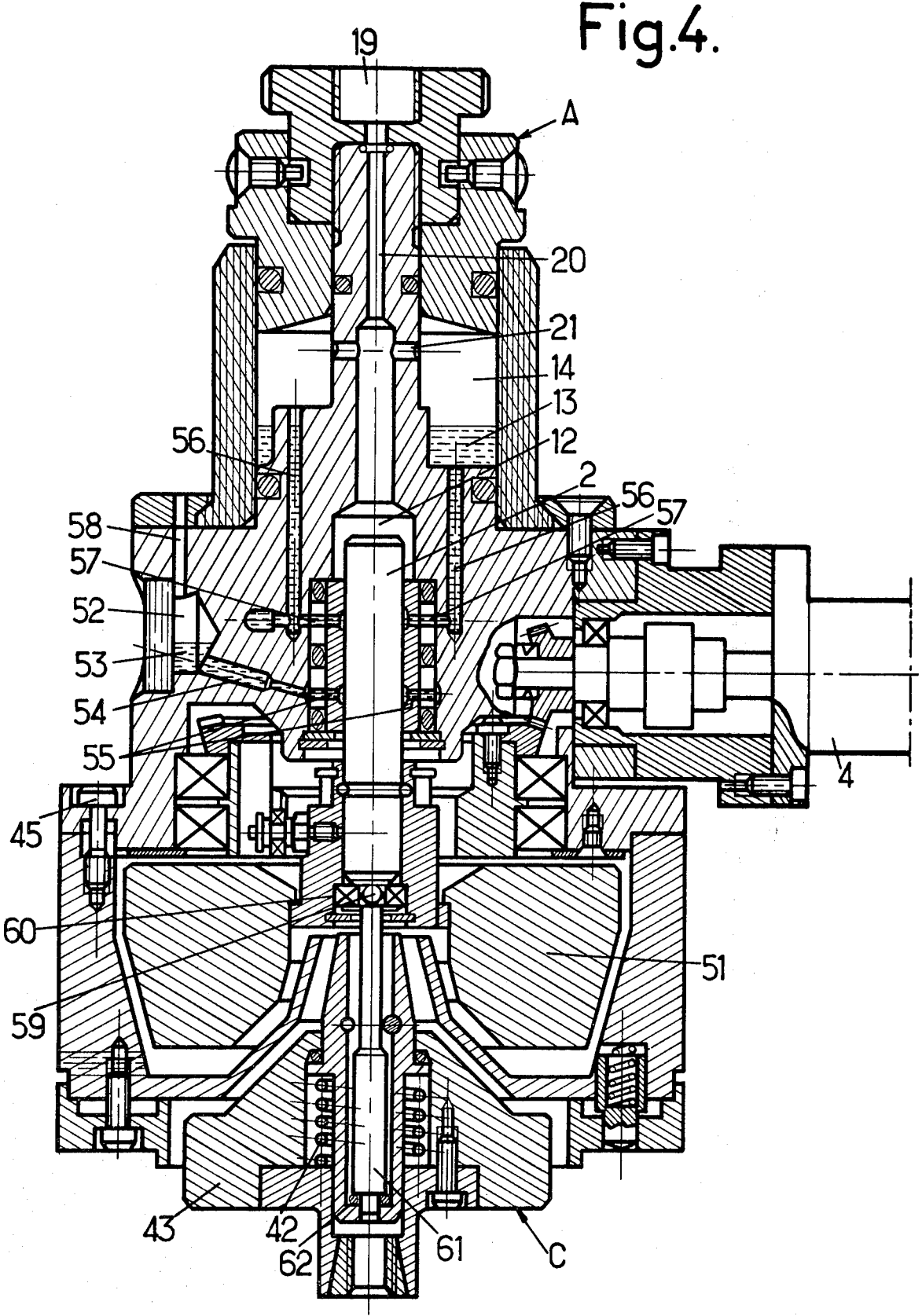

FIG. 4, finally, is an axial section, similar to that of FIG. 2, but relating to a second embodiment of the assembly acting on the electromagnetic weighing machine properly speaking, with the force transmitting means.

In accordance with the invention, desiring to construct a device for the very accurate measurement of fluid pressures with display of the measured pressure, the following or similar is the way to set about it.

Figure 1:
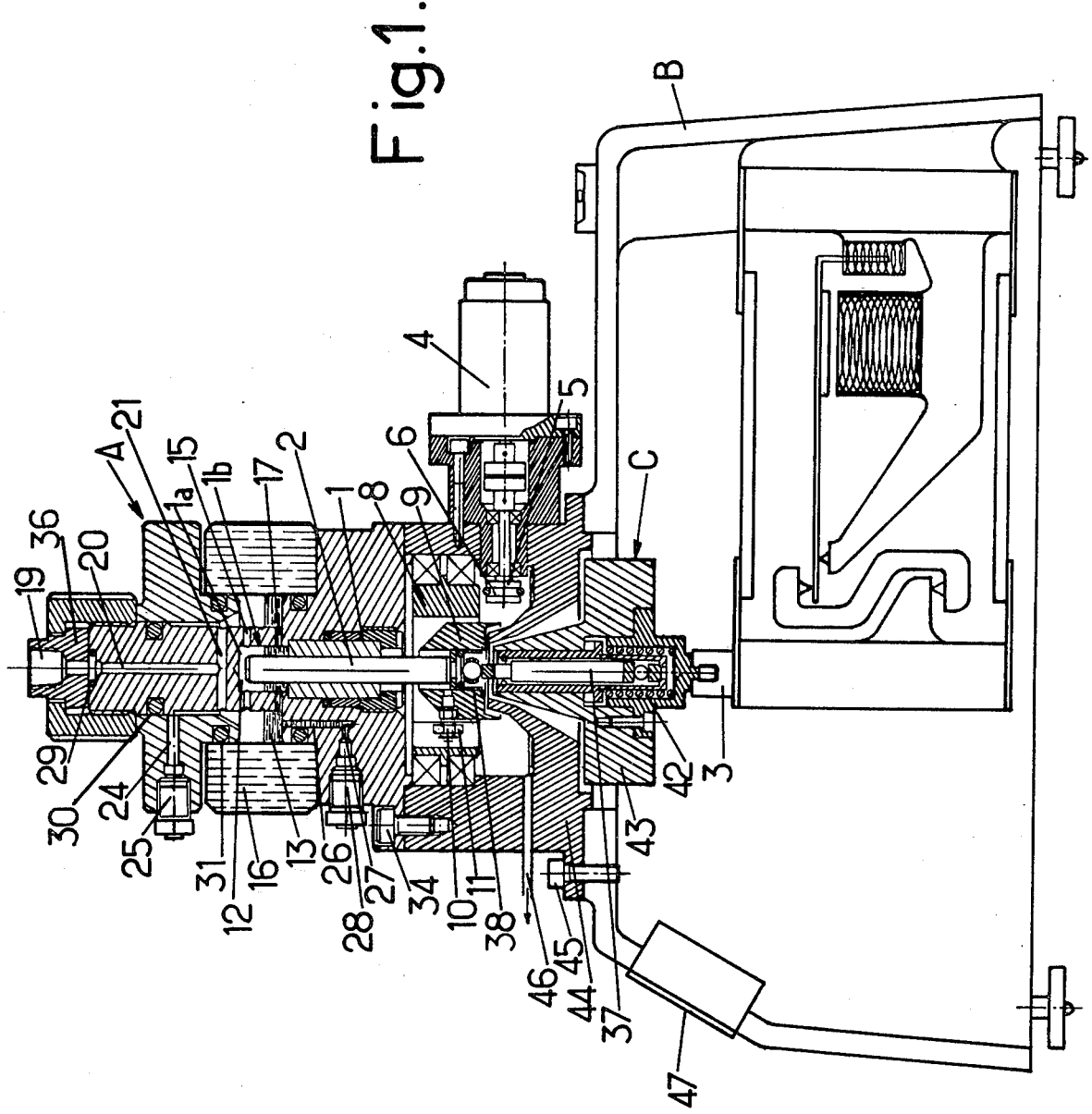
FIG. 1 shows, in general, a first embodiment of a device in accordance with the invention, in partial axial section.

Referring first of all to FIGS. 1 and 2, it can be seen that a device in accordance with the invention comprises three units, i.e. a unit A comprising essentially the measuring element with cylinder 1 and piston 2, an electromagnetic weighing machine B with shaft 3 for receiving the force to be measured and a connecting unit C transmitting the force of piston 2 of unit A to shaft 3 of weighing machine B. FIG. 1 shows the assembly of elements A, B and C, whereas FIG. 2 only illustrates, on a larger scale, units A and C which are separated, in this figure, by the broken line XX.

Unit A (see more particularly FIG. 2) comprises first of all, as indicated above, a cylinder 1 and a piston 2 which form, together, the measuring member properly speaking. Cylinder 1 is vertical.

Cylinder 1 is mounted in a measuring block 1b which comprises a bottom or cylinder head 1a in its upper part.

Piston 2 may slide vertically in cylinder 1 in which it moves with viscous friction, a film of hydraulic fluid being interposed therebetween.

Piston 2 is rotated in cylinder 1 by means of an electric motor 4 rotating a pulley 5 which carries, in a groove 6, an 0-ring 7 (made from elastomer) rubbing on the periphery of a pulley 8 which rotates, in its turn, the head 9 of piston 2 secured in rotation to pulley 8 by a shaft 10 carrying a bearing 11. It will be noticed that, because of ring 7, a friction drive is provided which limits the torque of motor 4 should piston 2 jam under the effect of an overpressure acting on piston 2 from top to bottom.

The pressure to be measured is applied to chamber 12 existing between the bottom 1a of cylinder 1 and piston 2.

When it is a question of measuring a gas pressure, a quantity of oil 13 is provided in the lower part of an annular chamber 14 which surrounds measuring block 1b and which communicates with chamber 12 through radial channels 15 and 17. The oil level 18 in chamber 14 may be easily located because of an unbreakable organic glass envelope 16, made for example from methyl methacrylate. This oil level also reigns inside chamber 12 because of the radial channels 17. The level 18 of the oil in chamber 14 must then be maintained between channels 15 and channels 17. It is then to the mouth 19, which communicates through channels 20, 21 and a recess 22 in the shape of a truncated cone with chamber 14, and so finally with chamber 12, that the pressure to be measured is applied.

When it is a question of measuring an oil (or another hydraulic fluid) pressure, chambers 12 and 14 are filled with oil through the truncated cone-shaped recess 22 and channels 21 and 20, by applying the oil pressure to the mouth 19 through opening 25, and chambers 12 and 14 are purged of the gas which they contain through channels 23 and 24. At the end of the operation, the oil is removed through channels 26 and 27 and discharge opening 28.

In FIG. 2, there is shown a series of 0-seals 29, 30, 31, 32 and 33 providing fluid-tightness.

The measuring element 1, 2 may be changed by acting on the screws 34 and nut 35. Nut 36 allows the mouth 19 forming a connection to be changed and annular chamber 14 to be cleaned.

In short, in unit A the gas or hydraulic fluid pressure which it is desired to measure acts on piston 2, the force which this latter receives corresponding to the product of the effective area of the piston (determined hereafter) multiplied by the pressure to be measured acting on piston 2 from top to bottom.

Unit C serves for transmitting this force to the shaft 3 of the weighing machine which provides measurement thereof. The purpose of this unit C is to transmit this force while limiting it should an overpressure act on piston 2. The member for transmitting the force of assembly C is formed by a link 37.

Because of the rotation of piston 2, special precautions must be taken for transmitting the force between piston 2 and shaft 3 (FIG. 1). A ball abutment 38 against a bearing 39 is provided at the upper part of link 37 in the lower head of piston 2, so as to be able to center them perfectly with respect to the shaft of piston 2 and with respect to the axis of link 37 through the ball 38.

The limitation and the damping of the force applied by piston 2 to shaft 3 of the weighing machine, so as to protect this latter, are provided by a double-damper 40, 41 and a load limiter 42, the whole being housed in a part 43 whose upper truncated cone-shaped portion is disposed in a cooperating part 44 of unit A and against which abuts the head of piston 9 should an overload occur.

Finally, the dirty lubricating oil is removed through a channel 46 provided in part 44.

Unit A may be separated from unit B forming the weighing machine properly speaking (FIG. 1) by means of screws 45.

Figure 3:
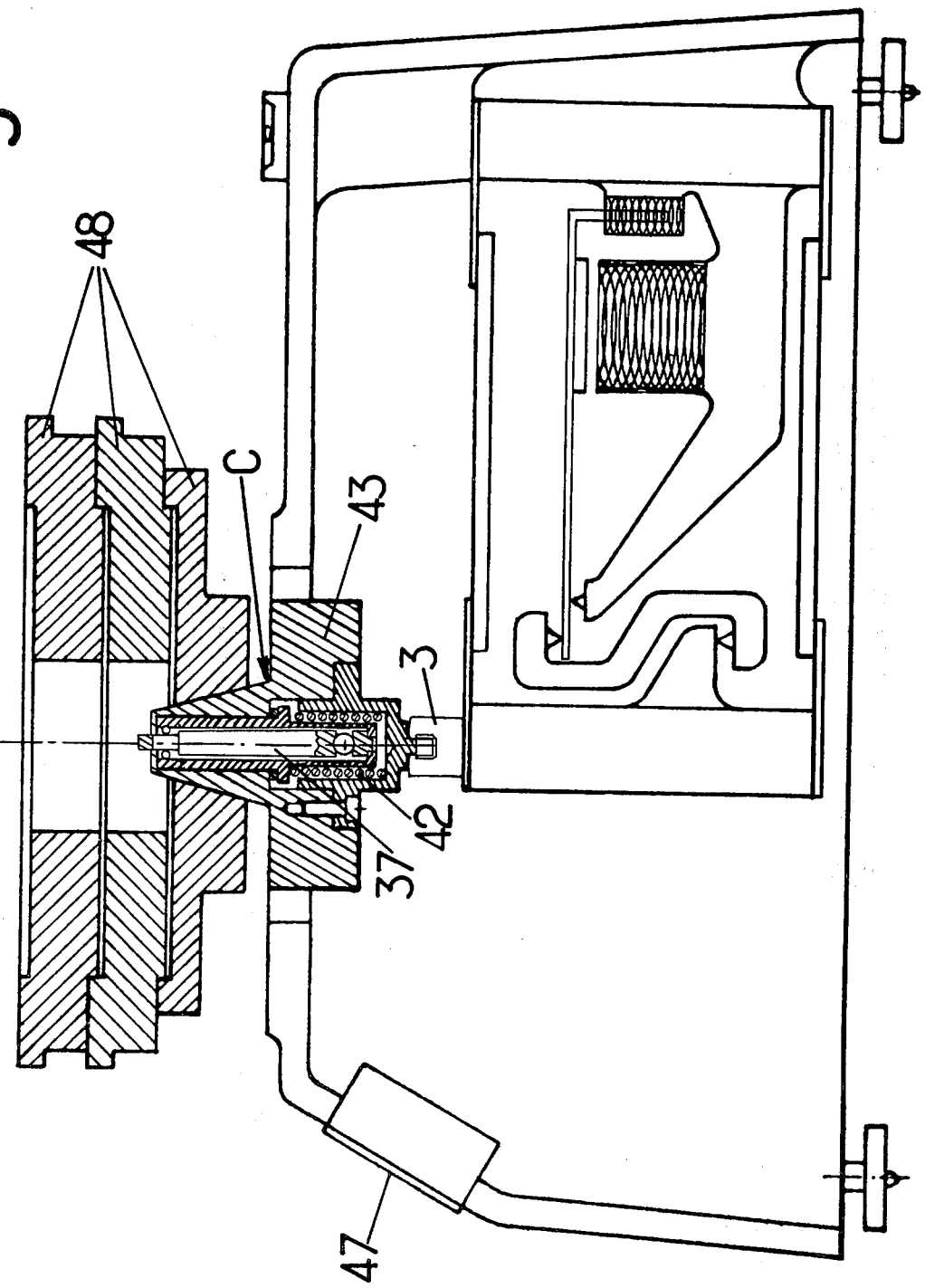
FIG. 3 shows the electromagnetic weighing machine with the force transmitting means, these latter carrying calibrated weights for the standardization of the weighing machine, these means and these weights being shown in axial section.

As for unit B, it will not be described in detail since it is formed by a precision electromagnetic weighing machine of conventional type. By way of example of such weighing machines, the electromagnetic precision weighing machines of the Swiss company METTLER, in the PL series, the electronic weighing machines of the German company SARTORIUS, the weighing machines of the German companies KERN and SAUTER may be mentioned. Such weighing machines display directly, preferably in digital form, on a dial 47 the force due to the masses applied to their shaft 3. In FIGS. 1 and 3 there is shown schematically the inside of the weighing machine essentially to show that it comprises electromagnetic means for rebalancing the force applied to shafts 3.

As previously pointed out, the measuring element properly speaking, formed by cylinder 1 and piston 2, is interchangeable so as to be able to use in the same device different effective sections, which enable very different values of the pressure to be measured, while remaining within the precision range of the weighing machine.

Advantageously, the theoretic effective sections of the interchangeable measuring elements are such that, under normal conditions of the earth's gravity (9.80665 m/sec$^2$), of atmospheric pressure (1.01325 bars) and at the temperature of 20° C., by loading the piston with a stainless-steel weight of 1 kg, a whole and simple number of bars (or psi) is counterbalanced.

This whole number is proper to each measuring element and is called the normal conversion coefficient (KN).

$$\text{It has for definition: } KN = g_n \frac{\left(1 - \frac{\rho_{air}}{\rho_{st. steel}}\right)}{S_{th}} \quad (2)$$

$g_n$ being the acceleration of normal gravity, $S_{th}$ the average theoretical effective section of the two sections of the cylinder and of the piston (for the different positions of the piston which rotates in the cylinder) and $\rho_{air}$ and $\rho_{st.steel}$ the specific masses or the densities of the air and of the stainless steel respectively.

From this conversion coefficient KN, the pressure is given by the formula $P = KN.M$ (3) under normal conditions and with a piston whose effective section is exactly equal to the theoretical section, the definition of which has just been given.

In fact, the true effective section (true S) of a measuring element is, in general, slightly different from the desired theoretical section ($S_{th}$) because of manufacturing tolerances.

This true section is determined with great accuracy by comparison of the absolute pressure standards of prior type connected to the national standards. The local earth's gravity ($g_1$) at the place where the measuring element is used is, in general, different from the normal gravity ($g_n$); the result is that, for a temperature of 20° C., the general expression of the pressure measured by an element loaded with a stainless-steel mass M is:

$$P = KN \cdot \frac{S_{th}}{\text{true } s} \cdot \frac{g_1}{g_n} \cdot M \tag{4}$$

The self-standardizing procedure of the instrument is the following: the gravity at the place of standardization being $g_1$, a mass M corresponding to the maximum range is placed on the weighing machine and the gain of the weighing machine is adjusted so that the digital display of the weighing machine indicates the value $$A = \frac{S_{th} \cdot g_1}{\text{true } S \cdot g_n} \cdot M \tag{5}$$

Thus, if mass M is replaced by a measuring element with normal conversion coefficient KN subjected to a pressure P, the pressure is determined from the general expression by the product:

$$P = KN \cdot A \tag{6}$$

It should be noted that once this standardization has been effected, the above relationship is valid for all values which A may assume, corresponding to different values of P.

Furthermore, this self-standardization remains valid even if the instrument, once adjusted, is used in a place where the local gravity is different from that of the place of calibration.

On the other hand, if it is desired to check the calibration at this new position, it is necessary to recalculate a new value of A to be displayed corresponding to the new value of $g_1$.

The coupling achieved in accordance with the invention between a measuring element, formed by a cylinder 1 and a piston 2, and an electromagnetic weighing machine, whose gain has been adjusted as indicated above, enables a device to be obtained whose calibration may be checked at all times without having to rely on an external pressure standardization. It is then a self-standardizable device (for there is no need of an external pressure standard).

The rotation of piston 2 in cylinder 1 provides good sensitivity and good repeatability of the measurements, for it ensures centering of the piston by the creation of a uniform oil film in the clearance between the piston and the cylinder. This setting in rotation of the piston involves the connection between piston 2 and shaft 3 of the weighing machine, but it was pointed out above how the connection unit C provides such a connection with transmission of the force, but with limitation in the case of an overpressure and filtration of the parasite effects due to the rotation of the piston.

The speed of rotation of piston 1 in cylinder 2 is advantageously chosen so that the piston effects one complete revolution in a period of time which is less than the integration time, i.e. the measuring rate, of the electronic device of the weighing machine, which provides a stable display at 47 while eliminating the fluctuations of the measurement due to rotation of the piston. Generally, the measuring rate of the weighing machine is between 0.2 and 1 second and in this case the speed of rotation of the piston must be greater than 5 to 1 revolutions per second.

In FIG. 4, units A and C are shown in a second embodiment of the invention, using the same reference numbers as in FIGS. 1 to 3 to designate corresponding elements.

The embodiment of FIG. 4 is distinguished from that of FIGS. 1 to 3:

(a) by an annular part 51 for loading piston 2 so as to allow measurement not only of depressions but also of overpressures with respect to the atmospheric pressure, (b) by the lubricating system of piston 2 and (c) by the connection between piston 2 and the electromagnetic weighing machine.

(a) The annular part 51 weighs for example 1 kg and it is intended to create an original shift or bias of the display of the pressure on the weighing machine.

The pressure to be measured always acts on mouth 19 and so on the upper face of piston 2 in chamber 12 in communication with mouth 19.

When it is the atmospheric pressure which acts on mouth 19, the weighing machine displays a numerical value greater than 10,000 points because of part 51.

This numerical value is brought back to zero by acting on the adjustment means of the electromagnetic weighing machine.

When a pressure is then measured, which acts on mouth 19:

if this pressure is less than the atmospheric pressure (it is then a question of a depression), the weighing machine displays a number of points between 0 and −10,000;

if this pressure is greater than the atmospheric pressure (it is then a question of an overpressure), the weighing machine displays a number of points greater than 0 (for example between 0 and +30,000).

(b) In the embodiment of FIG. 4, a double lubricating system is provided with two reservoirs 52 and 14 for the lubricating oil.

When the pressure applied to mouth 19 is less than the atmospheric pressure, the oil 53 in reservoir 52 reaches, through channels 54 and 55, the periphery of piston 2 which rotates in cylinder 1.

On the contrary, when the pressure applied to mouth 19 is greater than the atmospheric pressure, the oil 13 in reservoir 14 reaches, through channels 56 and 57, the periphery of piston 2 which rotates in cylinder 1.

It should be noted that it is the difference between the pressure acting on mouth 19 and the atmospheric pressure acting through channel 58 in reservoir 52 and through channels 20 and 21 in reservoir 14 which causes automatically the first or the second type of lubrication.

(c) The transmission of the pressure from piston 2 to the weighing machine is achieved by a ball 59 (for example made from tungsten carbide), centered by means of a bearing 60, and a rod 61 acting on the upper part of weighing machine B (FIGS. 1 and 3) through a damper formed by an 0-ring 62.

By evacuating a space communicating with mouth 19, it is possible to form a barometer with the embodiment of FIG. 4. Thus the atmospheric pressure may be measured with an accuracy of 0.1 millibar. Such a barometer is very faithful, very precise and very reliable.

Of course, the whole of arrangements a and b, on the one hand, and arrangement c on the other, are independent and it is then possible to modify the embodiment of FIGS. 1 to 3 so that it comprises only the whole of arrangements a and b or else only modification c.

It will be noted that the device of the invention presents a certain number of advantages some of which have already been mentioned, particularly the following:

possibility of measuring a gas pressure without the variation of the oil level in reservoir 14 affecting the measurement;

possibility of measuring an oil pressure by completely filling this reservoir;

low influence of the rotation of the piston on the display of the measured pressure, thanks to proper perpendicularity of the rotational plane of pulley 8 with respect to the shaft of piston 2 and to the speed of rotation selected;

limitation of the torque of the motor should the piston jam because of an overpressure thanks to the use of a friction drive between pulley 5 and pulley 8 (ring 7);

easy dismantling of the measuring element, which enables measuring elements to be used (pistons and cylinders) having different effective section, which results in an excellent precision of the measurement within a wide range of pressures;

easy dismantling of the measuring block (unit A), which allows weights to be placed directly on units B and C (FIG. 3) so as to provide self-standardization; the fact of being able to place several weights 48, as shown in FIG. 3, permits the linearity of the weighing machine to be checked;

removal of the dirty oil (through channel 46) so as to avoid pollution of the weighing machine;

possibility of using, like unit C, a standard electromagnetic weighing machine after having made very limited transformations thereto, which allows it moreover to be continued to be used for weighing masses;

possibility of measuring overpressures or depressions (with respect to the atmospheric pressure).

The device in accordance with the invention presents in short the advantage, over devices of the prior art, of avoiding the use of a series of stainless-steel calibrated weights, which are costly and the handling of which is time consuming and often laborious; the device of the invention also avoids the need for means for automatically placing and removing calibrated weights, which means are cumbersome and expensive; furthermore, automatic display is obtained, particularly numerical display, which further increases the convenience in use and allows the transfer of information to data acquisition and processing systems.

Finally, the accuracy is excellent over a large range of values of the pressure.

As is evident and as it follows moreover already from what has gone before, the invention is in no wise limited to those of its modes of application and embodiments which have been more specially considered; it embraces, on the contrary, all variations thereof.

I claim:

1. A device for the very accurate measurement of a fluid pressure and the display of the measured pressure, comprising in combination:

a very accurate electromagnetic weighing apparatus with a vertical shaft having a top extremity and with display means for displaying the weight applied to said top extremity of said shaft;

a removable measuring unit including a vertical cylinder and a vertical piston adapted to slide and to rotate in said cylinder with viscuous friction, said piston having a top extremity and a bottom extremity;

means for receiving said measuring unit;

conduit means for applying to said top extremity of said piston the pressure to be measured;

driving means for rotating said piston in said cylinder; and force transmitting means connecting said bottom extremity of said piston to said top extremity of said shaft and transmitting to said top extremity of said shaft the force to which is submitted said bottom extremity of said piston.

2. The device of claim 1, wherein the driving means impart to said piston a rotation speed such that the duration of a complete revolution of said piston is smaller than the integration time of the electronic measuring device of the weighing machine so as to have a stable display determined by the average of the forces applied to the piston during its rotation through a complete revolution.

3. The device of claim 1, further comprising means for limiting the maximal force transmitted by said force transmitting means.

4. The device of claim 1, wherein said driving means include friction coupling means, whereby the torque applied to said piston is limited in case of a hindered rotation of said piston in said cylinder.

5. The device according to claim 1, wherein said force transmitting means include a link, a ball abutment and a bearing disposed in the lower head of said piston so as to center them perfectly with said piston.

6. The device according to claim 5, further including, at the end of said link, a double damper and further a load limiter associated with said link.

7. The device according to claim 1, wherein said force transmitting means include a ball, with means for centering said ball, a rod in contact with said ball and a damper in contact with said rod.

8. The device according to claim 1, further including a double lubricating circuit, with two separate reservoirs, the lubricating fluid contained in one of the two reservoirs serving for lubricating the piston during the measurement of a depression, whereas the lubricating fluid contained in the other of the two reservoirs serves for lubricating the piston during the measurement of an overpressure.

9. The device of claim 1, wherein the cross-section of said piston is such that, under normal conditions of pressure and temperature and for normal values of g, an integer of pounds per square inch is counterbalanced by a mass of 1 pound.

10. The device of claim 1, wherein the cross-section of said piston is such that, under normal conditions of pressure and temperature and for normal values of g, an integer of bars is counterbalanced by a mass of 1 kilogram.

11. A system for a very accurate measurement of a fluid pressure in a wide range and the display of the measured pressure, comprising in combination:

a very accurate electromagnetic weighing apparatus with a vertical shaft having a top extremity and with display means for displaying the weight applied to said top extremity of said shaft;

a set of removable measuring units, each unit including a vertical cylinder and a vertical piston adapted to slide and to rotate inside said cylinder with viscuous friction, said piston having a top extremity and a bottom extremity and the cross-sections of the pistons being different for each unit;

means for receiving a selected one of said measuring units;

a conduit means for applying to said top extremity of said piston the pressure to be measured;

driving means for rotating said piston in said cylinder; and force transmitting means connecting said bottom extremity of said piston to said top extremity of said shaft and transmitting to said top extremity of said shaft the force to which is submitted said bottom extremity of said piston.

12. The system of claim 11, further including a removable element having a given weight, said element being adapted to be used for adding a force, corresponding to the weight thereof, to the force transmitted from said piston to said shaft, thereby allowing also a pressure lower than the atmosphere pressure to be measured by the system.

13. The system of claim 11, further comprising a set of calibrated elements of accurately known mass adapted to be substituted to a removable measuring unit for allowing to calibrate the system.

* * * * *